(12) United States Patent
Satongar et al.

(10) Patent No.: US 11,115,773 B1
(45) Date of Patent: Sep. 7, 2021

(54) AUDIO SYSTEM AND METHOD OF GENERATING AN HRTF MAP

(71) Applicant: Apple Inc., Cupertino, CA (US)

(72) Inventors: Darius A. Satongar, Santa Clara, CA (US); Martin E. Johnson, Los Gatos, CA (US); Peter Victor Jupin, Copenhagen (DK); Jonathan D. Sheaffer, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/560,485

(22) Filed: Sep. 4, 2019

Related U.S. Application Data

(60) Provisional application No. 62/737,724, filed on Sep. 27, 2018.

(51) Int. Cl.
| | |
|---|---|
| *H04R 5/04* | (2006.01) |
| *G06T 7/70* | (2017.01) |
| *H04R 5/033* | (2006.01) |
| *H04S 7/00* | (2006.01) |

(52) U.S. Cl.
CPC ............... *H04S 7/304* (2013.01); *G06T 7/70* (2017.01); *H04R 5/033* (2013.01); *H04R 5/04* (2013.01); *G06T 2207/10048* (2013.01); *H04S 2420/01* (2013.01)

(58) Field of Classification Search
CPC ....... H04S 7/304; H04S 2420/01; G06T 7/70; G06T 2207/10048; H04R 5/033; H04R 5/04
USPC .......................................... 381/17, 309, 310
See application file for complete search history.

(56) References Cited

U.S. PATENT DOCUMENTS

| | | | |
|---|---|---|---|
| 9,769,585 B1 | 9/2017 | Hills | |
| 9,794,722 B2 | 10/2017 | Petrov | |
| 9,955,279 B2 | 4/2018 | Riggs et al. | |
| 10,034,092 B1* | 7/2018 | Nawfal | H04R 5/04 |
| 2006/0251276 A1* | 11/2006 | Chen | H04S 1/007 |
| | | | 381/310 |
| 2006/0274901 A1* | 12/2006 | Terai | H04S 1/005 |
| | | | 381/17 |
| 2017/0332186 A1* | 11/2017 | Riggs | H04S 7/301 |
| 2019/0215637 A1* | 7/2019 | Lee | G06K 9/6204 |
| 2019/0355172 A1* | 11/2019 | Dsouza | G06T 17/00 |

OTHER PUBLICATIONS

Aki Härmä—Augmented reality audio for mobile and wearable appliances; Journal of the Audio Engineering Society 52(6):618-639—Jun. 2004; 23 Pages.

* cited by examiner

*Primary Examiner* — Vivian C Chin
*Assistant Examiner* — Friedrich Fahnert
(74) *Attorney, Agent, or Firm* — Womble Bond Dickinson (US) LLP

(57) ABSTRACT

An audio system and a method of using the audio system to generate a head-related transfer function (HRTF) map, are described. The audio system can determine one or more HRTF and corresponding HRTF locations along an azimuthal path of an azimuth extending around a head of a user. The HRTFs or HRTF locations can be measured, and other HRTFs or HRTF locations can be interpolated or extrapolated. The HRTF map can include the HRTFs assigned to HRTF locations along the azimuth. HRTFs from the HRTF map are used to render spatial audio to the user. Other aspects are also described and claimed.

20 Claims, 8 Drawing Sheets

HRTF MAP
208

402, 408, 410

404, 709, 802

| HRTF | LOCATION (θ) | TYPE |
|---|---|---|
| 1 | + 25 | MEASURED |
| 2 | + 35 | MEASURED |
| 3 | + 30 | INTERPOLATED |
| 4 | − 25 | EXTRAPOLATED |
| 5 | − 30 | EXTRAPOLATED |
| ⋮ | ⋮ | ⋮ |

FIG. 9

AUDIO SYSTEM AND METHOD OF GENERATING AN HRTF MAP

This application claims the benefit of priority of U.S. Provisional Patent Application No. 62/737,724, filed on Sep. 27, 2018, and incorporates herein by reference that provisional patent application.

BACKGROUND

Field

Aspects related to audio systems are disclosed. More particularly, aspects related to audio systems used to render spatial audio are disclosed.

Background Information

Spatial audio can be rendered using headphones that are worn by a user. For example, the headphones can reproduce a spatial audio signal communicated by a device to simulate a soundscape around the user. An effective spatial sound reproduction can render sounds such that the user perceives the sound as coming from a location within the soundscape external to the user's head, just as the user would experience the sound if encountered in the real world.

When a sound travels to a listener from a surrounding environment in the real world, the sound propagates along a direct path, e.g., through air to the listeners ear canal entrance, and along one or more indirect paths, e.g., by reflecting and diffracting around the listeners head or shoulders. As the sound travels along the indirect paths, artifacts can be introduced into the acoustic signal that the ear canal entrance receives. User-specific artifacts can be incorporated into binaural audio by signal processing algorithms that use spatial audio filters. For example, a head-related transfer function (HRTF) is a filter that contains all of the acoustic information required to describe how sound reflects or diffracts around a listener's head, torso, and outer ear before entering their auditory system.

To implement accurate binaural reproduction, a distribution of HRTFs at different angles relative to a listener can be determined. For example, HRTFs can be measured for the listener in a laboratory setting using an HRTF measurement system. A typical HRTF measurement system includes a loudspeaker positioned statically to the side of the listener. The loudspeaker can emit sounds directly toward a head of the listener. The listener can wear ear microphones, e.g., microphones inserted into the ear canal entrances of the listener, to receive the emitted sounds. Meanwhile, the listener can be controllably rotated, e.g., continuously or incrementally, about a vertical axis that extends orthogonal to the direction of the emitted sounds. For example, the listener can sit or stand on a turntable that rotates about the vertical axis while the loudspeaker emits the sounds toward the listener's head. As the listener rotates, a relative angle between a direction that the listener faces and the direction of the emitted sounds changes. The sounds emitted by the loudspeaker and the sounds received by the microphones (after being reflected and diffracted from the listener anatomy) are be used to determine HRTFs corresponding to the different relative angles. Accordingly, a dataset of angle-dependent HRTFs can be generated for the listener.

An HRTF selected from the generated dataset of angle-dependent HRTFs can be applied to an audio input signal to shape the signal in such a way that reproductions of the shaped signal realistically simulates a sound traveling to the user from the relative angle at which the selected HRTF was measured. Accordingly, a listener can use simple stereo headphones to create the illusion of a sound source somewhere in a listening environment by applying the HRTF to the audio input signal.

SUMMARY

Existing methods of generating datasets of angle-dependent head-related transfer functions (HRTFs) are time-consuming or impractical to perform outside of a laboratory setting. For example, HRTF measurements currently require an HRTF measurement system to be used in a controlled laboratory setting. Accordingly, accurate HRTF measurements require access to a specialized laboratory, which can be costly, as well as time to visit the specialized laboratory to complete the measurements.

An audio system and a method of using the audio system to generate an HRTF map for a user, are described. The HRTF map contains a dataset of angle-dependent HRTFs at respective HRTF locations on an azimuth extending around a head of the user. By applying an HRTF from the HRTF map to an audio input signal, a spatial audio signal corresponding to the respective HRTF location can be generated and played for the user. When reproduced, the spatial audio signal can accurately render a spatial sound to the user.

The method of using the audio system to generate the HRTF map can include generating, sounds at known locations along an azimuthal path extending along a portion of the azimuth. For example, a mobile device can be moved, e.g., continuously, along the azimuthal path while a device speaker emits sounds within path segments of the azimuthal path. The locations that sounds are emitted can be known locations. For example, the mobile device can have a structured light scanner to capture images for determining a relative distance and orientation of the mobile device relative to the headphones being worn by the user. A microphone of the headphones can detect input signals corresponding to the sounds. For example, the input signals can represent directly received sounds and indirectly received sounds propagating toward the user from the mobile device as it moves along the azimuth. One or more processors of the audio system can determine an HRTF of each path segment based on the input signals, and the HRTF can be assigned to respective HRTF locations along the path segments based on the known locations that the corresponding sound was emitted. Accordingly, the one or more processors can generate the HRTF map, which includes the measured HRTFs assigned to respective HRTF locations along the azimuth.

In an aspect, the HRTF map includes one or more interpolated HRTFs. An interpolated HRTF can be determined based on a first HRTF measured for a first path segment and a second HRTF measured for a second path segment. For example, the interpolated HRTF can be an average of the measured HRTFs. The interpolated HRTF can be assigned to an interpolated HRTF location between the locations of the first HRTF and the second HRTF, e.g., on either the first path segment or the second path segment.

In an aspect, the HRTF map includes one or more extrapolated HRTFs. An HRTF measured for a path segment on a first side of a plane of symmetry of user can be projected onto azimuth on another side of the plane of symmetry. For example, the measured HRTF can be replicated at an extrapolated HRTF location that is projected along an extrapolation axis that extends perpendicular to the plane of symmetry. The extrapolated HRTF can therefore mirror the measured HRTF about the plane of symmetry.

A measured, interpolated, or extrapolated HRTF can be selected from the HRTF map and applied to the audio input signal to generate a spatial input signal. For example, an HRTF assigned to a particular location along or on the azimuth can be selected to render spatial audio for a sound source that is intended to be perceived at the location along the azimuth. An earphone speaker of the headphones can be driven with the spatial input signal to render the spatialized sound of the sound source at the corresponding azimuthal location. Accordingly, spatial audio can be accurately rendered to user.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

FIG. 9 is a pictorial view of an HRTF map containing HRTFs and HRTF locations, in accordance with an aspect.

DETAILED DESCRIPTION

Figure 1:
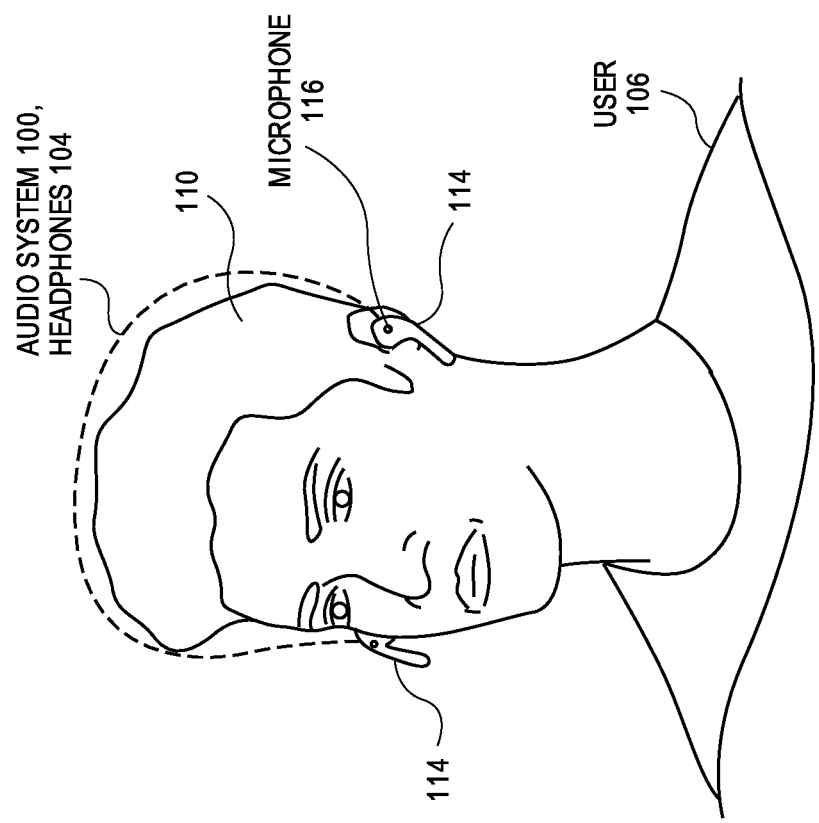
FIG. 1 is a pictorial view of a user handling an audio system, in accordance with an aspect.
Figure 1:
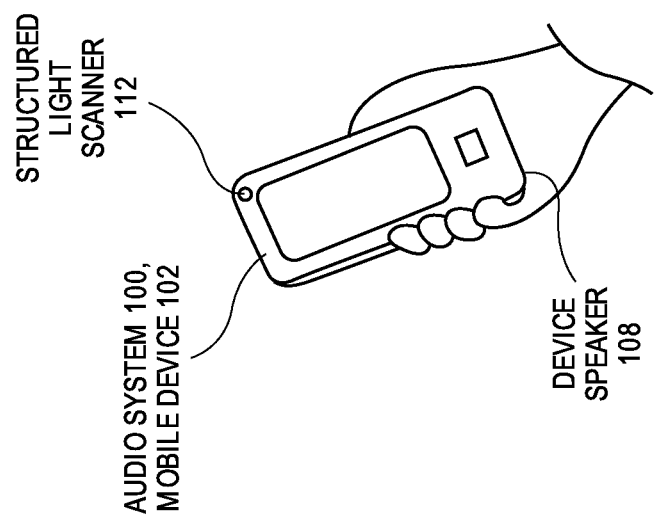

Aspects describe an audio system and a method of using the audio system to generate a head-related transfer function (HRTF) map for a user. The audio system can include a mobile device and a pair of headphones. One or more processors of the mobile device or the headphones can apply an HRTF from the HRTF map to an audio input signal to generate a spatial input signal for reproduction by the headphones. In an aspect, the mobile device can be a smartphone and the headphones can be circumaural headphones. The mobile device, however, can be another device for rendering audio to the user, such as a desktop computer, a laptop computer, etc., and the headphones can include other types of headphones, such as earbuds or a headset, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "in front of" may indicate a location in a first direction away from a reference point. Similarly, "behind" may indicate a location in a second direction away from the reference point and opposite to the first direction. Such terms are provided to establish relative frames of reference, however, and are not intended to limit the use or orientation of an audio system to a specific configuration described in the various aspects below.

In an aspect, an audio system is used to generate an HRTF map for a user. The HRTF map can contain HRTFs and corresponding HRTF locations on an azimuth around a head of the user. For example, the HRTFs can include measured HRTFs, interpolated HRTFs, or extrapolated HRTFs determined by one or more processors of the audio system based on input signals detected by headphones of the audio system. The input signals can correspond to sounds generated by a mobile device of the audio system while the mobile device is moved along an azimuthal path extending along a portion of the azimuth. An HRTF from the HRTF map can be applied to an audio input signal to generate a spatial input signal that accurately renders spatial audio to the user. As described below, the audio system can achieve HRTF measurements similar to a laboratory-controlled HRTF measurement system, however, the audio system can generate the HRTF map in a user-controlled (non-laboratory) setting with consumer electronics. Accordingly, the audio system can generate the HRTF map conveniently and inexpensively.

Referring to FIG. 1, a pictorial view of a user handling an audio system is shown in accordance with an aspect. An audio system 100 can include a device, e.g., a mobile device 102, such as a smartphone, a laptop, a portable speaker, etc., in communication with headphones 104. A user 106 of audio system 100 can listen to audio, such as music, binaural audio reproductions, phone calls, etc., played by headphones 104. Mobile device 102 can drive headphones 104 to render spatial audio to user 106.

In an aspect, mobile device 102 includes circuitry to perform the functions described below. For example, mobile device 102 can include a device speaker 108 to generate sounds while the user 106 moves mobile device 102 around a head 110 of user 106. Device speaker 108 can be, for example, a high-quality, broadband speaker capable of emitting predetermined sounds generated based on known audio signals, e.g., a sweep test signal. Mobile device 102 can include a camera and/or depth sensor to detect a distance between mobile device 102 and the head 110 of user 106 while mobile device 102 is moved around head 110. For example, mobile device 102 can include a structured light scanner 112 having a camera and a projector to project an infrared light pattern onto an object, e.g., head 110 of user 106. Structured light scanner 112 can capture, e.g., via the camera, several images while mobile device 102 moves continuously around head 110. Similarly, the camera can be an RGB camera 112, which captures several images while mobile device 102 is moving around head 110. Accordingly, one or more processors of audio system 100 can determine a distance between mobile device 102 and head 110 of user 106 at locations where device speaker 108 emits sounds toward user 106. Moreover, mobile device 102 can include circuitry to connect with headphones 104 wirelessly or by a wired connection to communicate signals used for audio rendering, e.g., binaural audio reproduction.

In an aspect, headphones 104 include circuitry to perform the functions described below. Headphones 104 can include one or more earphone speakers (FIG. 2) to play audio for user 106. Headphones 104 can include one or more earphones 114, and each earphone may be physically connected, e.g., by a headband or neck cord, or not physically connected. For example, headphones 104 can be circumaural headphones or supra-aural headphones having several earphones 114 connected by a headband. Alternatively, headphones 104 can be earbuds having several earphones 114 connected by a neck cord. Furthermore, each earphone 114 of headphones 104 may not be physically coupled to another earphone 114, such as in the case of wireless earbuds.

One or more earphones 114 of audio system 100 can include a microphone 116. Microphone(s) 116 may be built into headphones 104 to detect sounds internal to and/or external to the earphone 114. For example, microphone 116 can be mounted on each earcup of circumaural headphones 104, or on each earbud of a pair of earbuds. In an aspect, microphone 116 can be mounted to face a surrounding environment. Microphone(s) 116 can detect input signals corresponding to sounds received from the surrounding environment. For example, when device speaker 108 emits sounds toward head 110 of user 106, microphone(s) 116 can generate microphone output signals corresponding to the sounds. Accordingly, one or more processors of audio system 100 can use the detected input signals to determine HRTFs for user 106.

Figure 2:
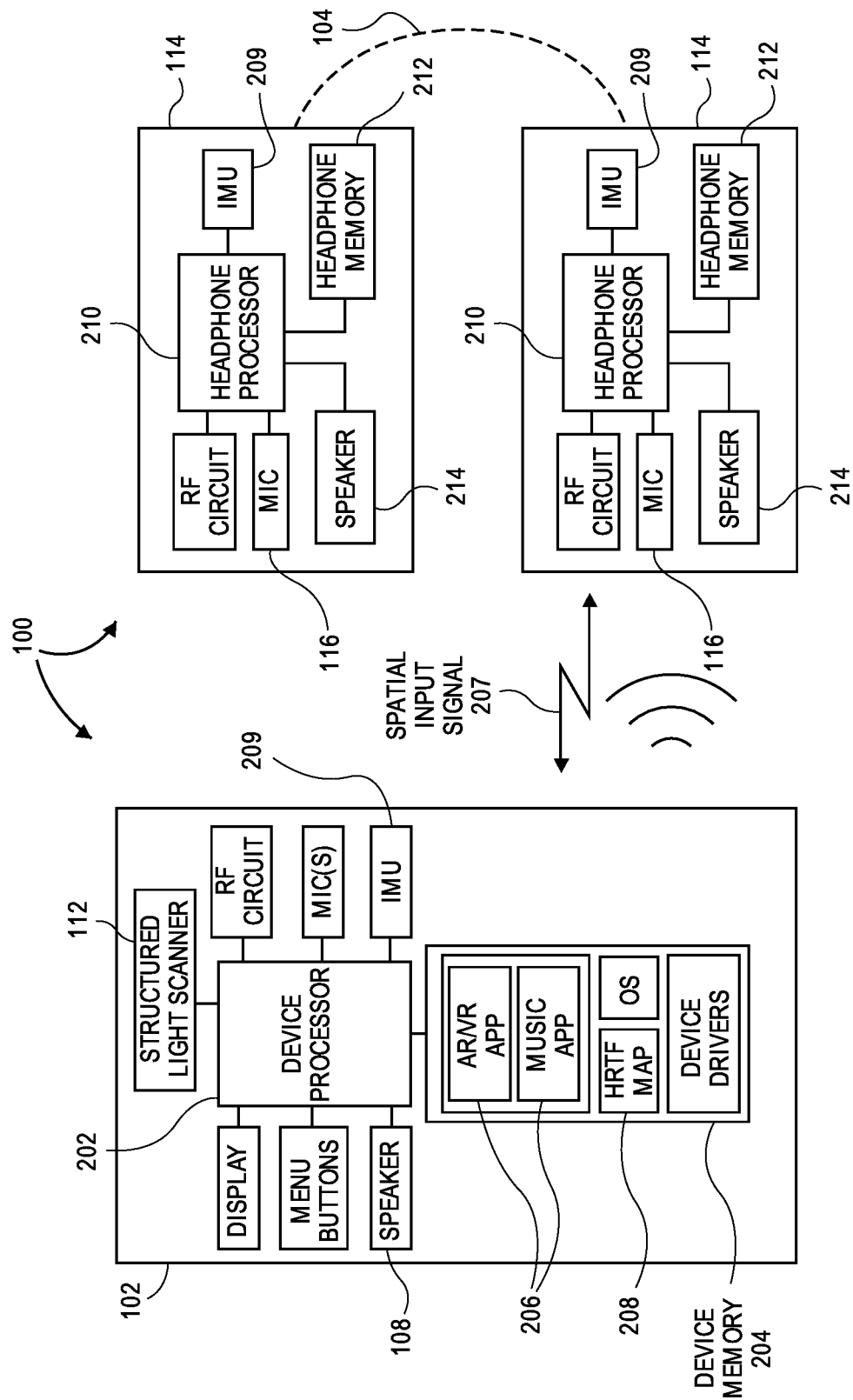
FIG. 2 is a block diagram of an audio system, in accordance with an aspect.

Referring to FIG. 2, a block diagram of an audio system is shown in accordance with an aspect. Audio system 100 can include mobile device 102, which can be any of several types of portable devices or apparatuses with circuitry suited to specific functionality. Similarly, audio system 100 can include headphones 104, which can be any of several types of head-mounted audio devices or apparatuses with circuitry suited to specific functionality. Accordingly, the diagrammed circuitry is provided by way of example and not limitation.

Mobile device 102 may include one or more device processors 202 to execute instructions to carry out the different functions and capabilities described below. Instructions executed by device processor(s) 202 may be retrieved from a device memory 204, which may include a non-transitory machine readable medium. The instructions may be in the form of an operating system program having device drivers and/or an audio rendering engine for rendering music playback, binaural audio playback, etc., according to the methods described below. Device processor(s) 202 can retrieve data from device memory 204 for various uses.

In an aspect, device processor(s) 202 can access and retrieve audio data stored in device memory 204. Audio data may be an audio input signal provided by one or more audio sources 206. Audio sources 206 can include phone and/or music playback functions controlled by telephony or audio application programs that run on top of the operating system. In an aspect, an audio application program can generate predetermined audio signals, e.g. sweep test signals, to be played by device speaker 108. Similarly, audio sources 206 can include an augmented reality (AR) or virtual reality (VR) application program that runs on top of the operating system. In an aspect, an AR application program can generate a spatial input signal 207 to be output to headphones 104. For example, mobile device 102 and headphones 104 can communicate signals wirelessly via respective RF circuitry, or through a wired connection. Accordingly, headphones 104 can render spatial audio to user 106 based on spatial input signal 207 from audio sources 206.

In an aspect, device memory 204 stores audio filter data for use by device processor(s) 202. For example, device memory 204 can store an HRTF map 208. HRTF map 208 can include a dataset of location-dependent HRTFs assigned to respective HRTF locations around head 110 of user 106. For example, the dataset can include measured or estimated HRTFs that correspond to specific angles and/or distances relative to user 106. A single HRTF of the dataset can be a pair of acoustic filters (one for each ear) that characterize the acoustic transmission from the particular location in a reflection-free environment to an entrance of an ear canal of user 106. The dataset of HRTFs encapsulate the fundamentals of spatial hearing of user 106. Accordingly, device processor(s) 202 can use HRTF map 208 to select an HRTF corresponding to a particular location, and apply the HRTF to an audio input signal to generate spatial input signal 207 corresponding to the particular location.

Device memory 204 can also store data generated by an imaging system of mobile device 102. For example, structured light scanner (or RGB camera) 112 of mobile device 102 can capture images of user 106 while mobile device 102 is moved around head 110, and the images can be stored in device memory 204. Images may be accessed and processed by device processor(s) 202 to determine the location (angle and/or distance) of mobile device 102 relative to microphone 116. The determined locations can correspond to HRTFs of user 106, as described below.

In an aspect, mobile device 102 can include other sensors to facilitate head tracking of user 106. For example, mobile device 102 can incorporate a camera, a depth sensor, or an inertial measurement unit (IMU) 209 to generate data corresponding to a distance between mobile device 102 and head 110, or a relative orientation between mobile device 102 and head 110.

To perform the various functions, device processor(s) 202 may directly or indirectly implement control loops and receive input signals from, and/or provide output signals to, other electronic components. For example, device processor(s) 202 may receive input signals from microphone(s) or menu buttons of mobile device 102, including through input selections of user interface elements displayed on a display.

Headphones 104 can include one or more earphone 114, e.g., a pair of earphones connected by a headband, a neck cord, or another physical connector (shown in phantom). In an aspect, headphones 104 are insert-type earphones having microphones 116 close to a pinna of user 106. More particularly, earphones 104 can be inserted into the ears of user 106 without blocking the pinna, e.g., as in the case of circumaural headphones. Headphones 104 may include one or more headphone processors 210 to execute instructions to carry out the different functions and capabilities described below. Instructions executed by headphone processor(s) 210 may be retrieved from a headphone memory 212, which may include a non-transitory machine readable medium. The instructions may be in the form of an operating system program having device drivers and/or an audio rendering engine for rendering music playback, binaural audio playback, etc., according to the methods described below. Headphone processor(s) 210 can access and retrieve data from headphone memory 212 for various uses.

In an aspect, headphone memory 212 stores audio data, e.g., a cached portion of spatial input signal 207 received from mobile device 102, or an HRTF filter for a respective earphone 114. Headphone processor 210 can receive the cached portion and apply the HRTF filter to the cached portion when rendering binaural playback to user 106 through headphones 104. In an aspect, all functionality of system 102 can be performed by the components in headphones 104.

Each earphone 114 of headphones 104 can include an earphone speaker 214 to output a sound to user 106. More particularly, earphone speakers 214 can receive an input signal from device processor 202 and/or headphone processor 210. The input signal can be a portion of spatial input signal 207. Spatial input signal 207 can drive earphone speaker 214 to generate and emit spatialized sound toward the ears of user 106, and therefore, to render spatial audio to user 106.

In an aspect, headphones 104 can include sensors to facilitate head tracking of user 106. For example, headphones 104 can incorporate a camera, a depth sensor, or an IMU 209 to generate data corresponding to a distance between mobile device 102 and headphones 104, or a relative orientation between mobile device 102 and headphones 104.

Figure 3:
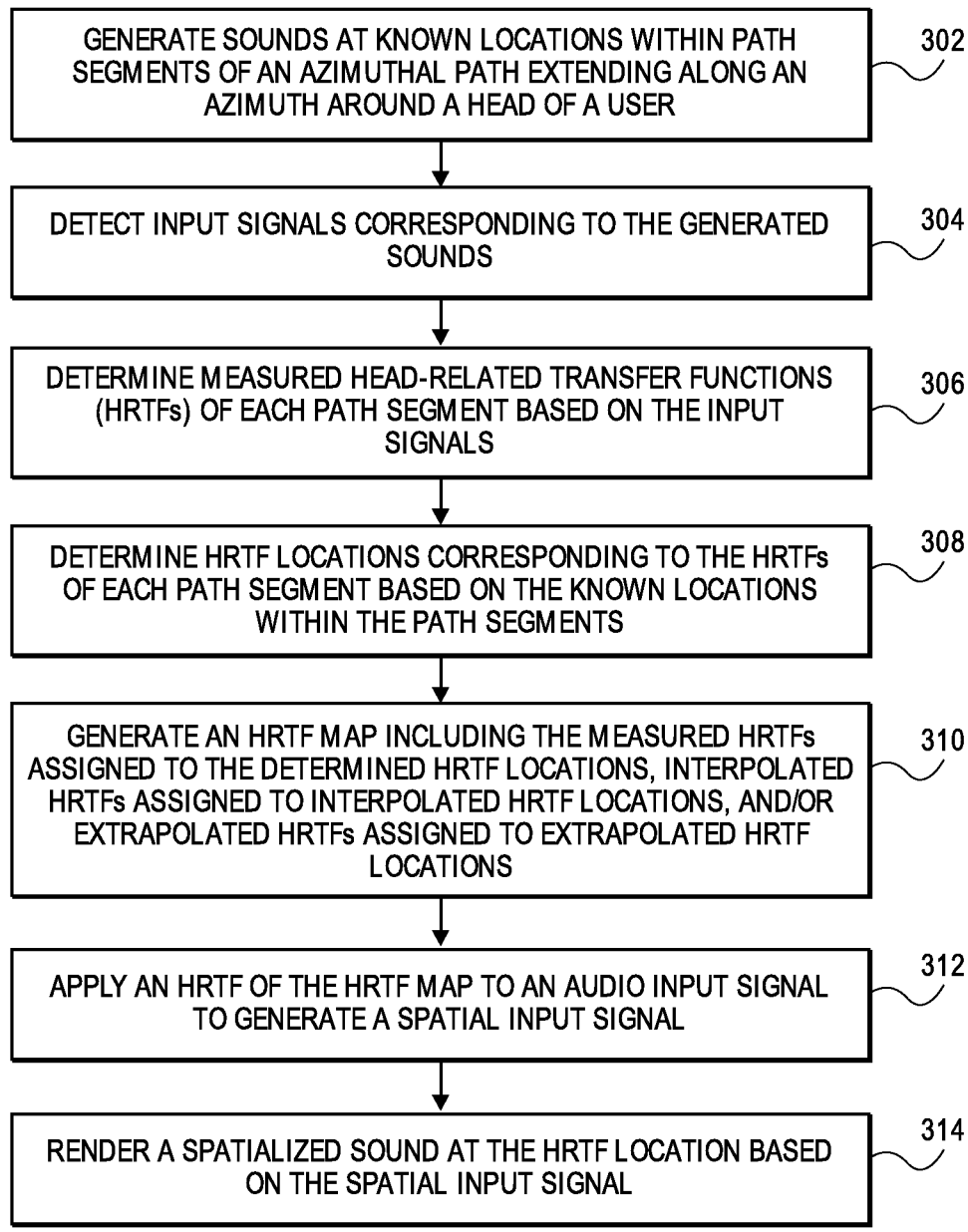
FIG. 3 is a flowchart of a method of generating a head-related transfer function (HRTF) map, in accordance with an aspect.

Referring to FIG. 3, a flowchart of a method of generating an HRTF map is shown in accordance with an aspect. The operations of the method of FIG. 3 relate to aspects shown in FIGS. 4-10, and accordingly, FIGS. 3-10 are described in combination below.

Figure 4:
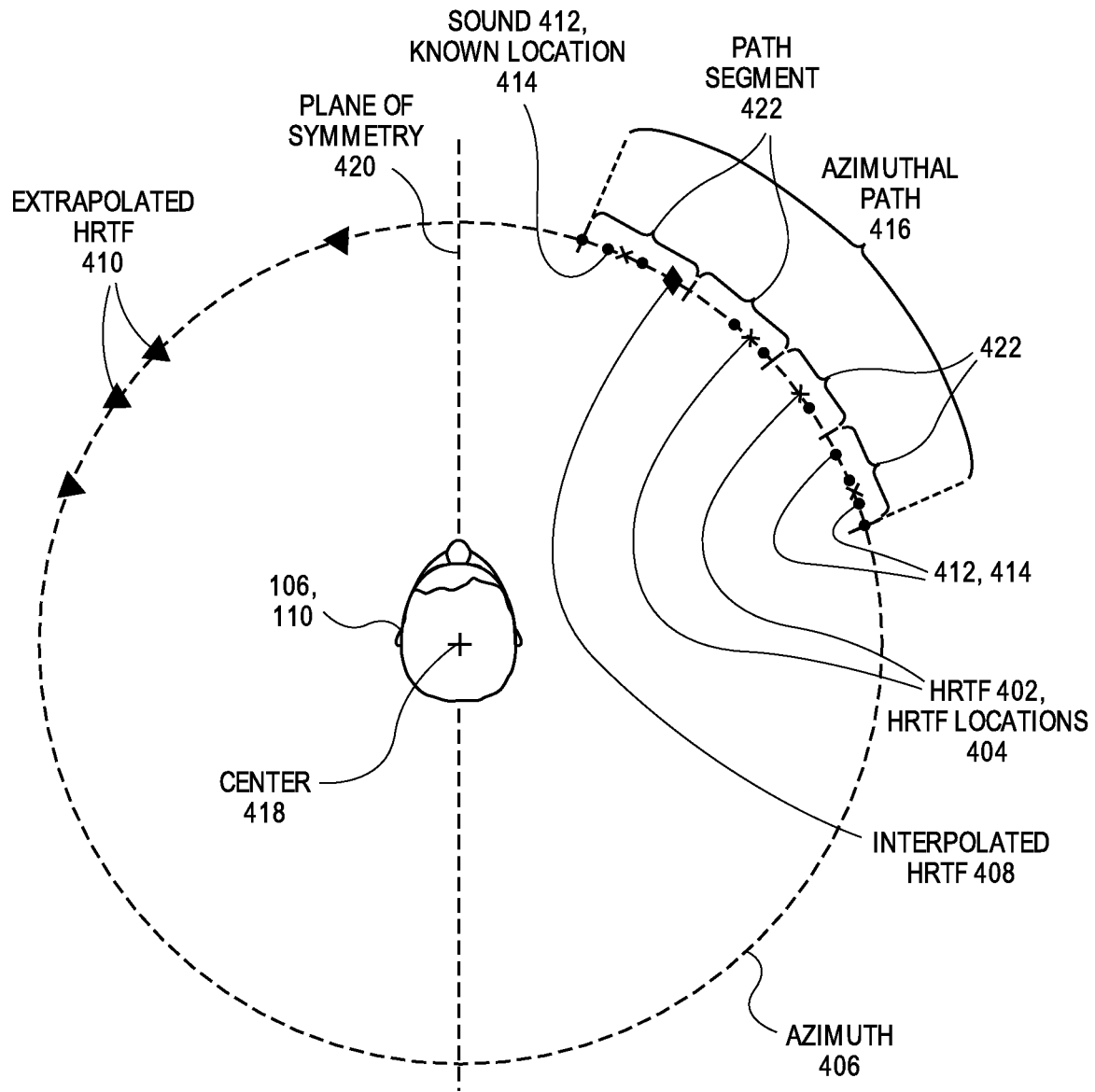
FIG. 4 is a pictorial view of operations to determine HRTFs and corresponding HRTF locations of an HRTF map, in accordance with an aspect.

Referring to FIG. 4, a pictorial view of operations to determine HRTFs and corresponding HRTF locations of an HRTF map is shown in accordance with an aspect. Audio system 100 can be used to perform user-controlled measurements of HRTFs of user 106. An HRTF measurement can be computed based on information about a driving signal used by device speaker 108 to generate sound, a received signal detected by microphone 116 of headphones 104 corresponding to the sound, and a relative location between device speaker 108 and microphone 116. The HRTF measurement can provide an HRTF 402 at a respective HRTF location 404 (denoted by crosses). By repeating these computations for several relative locations around head 110 of user 106, a partial and/or complete HRTF map 208 can be generated. As described below, the requisite data for HRTF computation and HRTF map generation can be gathered in situ by user 106 with mobile device 102 and headphones 104.

Measured HRTFs 402 can provide a partial HRTF map describing the HRTF distribution around head 110 of user 106. A density of the measured HRTF values may not be sufficiently dense, however, to provide realistic spatial audio. For example, when user-controlled measurements of HRTFs 402 are made at locations that span less than a complete azimuth 406, gaps in the HRTF map 208 may not allow an HRTF 402 to be selected for certain locations relative to user 106. Accordingly, post-processing can be used to generate a more complete, e.g., a continuous, HRTF map 208 that includes one or more interpolated HRTFs 408 (at locations denoted by diamonds) and one or more extrapolated HRTFs 410 (at locations denoted by triangles). Interpolated HRTFs 408 and extrapolated HRTFs 410 can be determined or inferred based on measured HRTFs 402, as described below.

At operation 302, device speaker 108 generates sounds 412 at known locations 414 (denoted by dots) along an azimuth 406 extending around head 110 of user 106. User 106 can hold mobile device 102 at an extended position, e.g., at arm's reach, and move mobile device 102 along an azimuthal path 416 around headphones 104 worn on head 110. User 106 can move mobile device 102 incrementally, e.g., sporadically, along azimuthal path 416. In an aspect, user 106 moves mobile device 102 continuously along azimuthal path 416 in a sweeping motion around head 110. Accordingly, azimuthal path 416 can be a continuous curved path, e.g., an arc, extending along a portion of azimuth 406. The term arc may be used in the sense of a curvilinear path having a variable radius from center 418, although in an aspect, azimuthal path 416 may have a constant radius and be a portion of a circle. While mobile device 102 moves along azimuthal path 416, device speaker 108 can generate sounds 412. Accordingly, sounds can be emitted at any distance (not necessarily at a constant radius) from center 418 as mobile device 102 moves along the arcing path.

Azimuthal paths 416 can be at different elevations. For example, user 106 can move mobile device 102 along several different curved paths at different times and at different elevations relative to a horizontal reference plane extending through the ears of user 106. Similarly, user 106 can move mobile device across an elevation arc passing through different azimuths around user 106. That is, the sweeping motion may have a vertical component, or a radius, theta, and phi component in terms of spherical coordinates. Measurements can be made across the elevation arcs on different azimuths in the manner described below.

The driving signals used by device speaker 108 to generate sounds 412 may be known. More particularly, a known stimulus signal can be played by device speaker 108 at locations along azimuthal path 416. For example, device speaker 108 can play a test sweep signal to generate sounds 412 of a known tone. Alternatively, device speaker 108 can play a user content signal to generate music or other acoustic outputs having greater spectral variation. In either case, the driving signal may be communicated to headphones 104 by device processor 202, and thus, the driving signal is known. The driving signals can be stored for post-processing as described below.

Sounds 412 can be generated at respective locations along azimuthal path 416. For example, user 106 can move mobile device 102 around head 110 for a period of time attempting to complete a defined region of azimuth 406 encompassing head 110 at a radius from center 418. Device speaker 108 can generate sounds 412 at known locations 414 throughout the period of time along azimuthal path 416. Movement of mobile device 102 around head 110 may, however, be incomplete. For example, user 106 may hold mobile device 102 approximately 15 degrees from plane of symmetry 420 and begin sweeping mobile device 102 rightward along an angle of approximately 80 degrees. Thus, azimuthal arc 416 spans 65 degrees of the complete azimuth 406. Accordingly, azimuthal path 416 can extend along a portion of azimuth 406. In FIG. 4, azimuthal path 416 is on azimuth 406, e.g., azimuth 406 includes azimuthal path 416 and a portion outside of azimuthal arc 416. Alternatively, azimuthal path 416 can deviate from azimuth 406, which is portrayed as a perfect circle in FIG. 4.

Azimuthal path 416 can be represented in frames. For example, during post-processing, the recorded data can be split into audio blocks corresponding to respective segments of azimuthal path 416. In an aspect, azimuthal path 416 includes several path segments 422 spanning respective angles between the start and end of azimuthal path 416. The angles of path segments 422 may be equal. Alternatively, path segments 422 may be defined to each include a same or a threshold number of known locations 414. More particularly, path segments 422 may be defined such that each path segment 422 contains enough information to determine a respective HRTF 402 for the path segment 422, as described below.

Known locations 414 of sounds 412 may be defined in a head coordinate system reference frame. For example, the locations may be defined by a radial distance of a radial extending from a center 418 of head 110 to the location where sound 412 is generated, and by an angle between the radial and a plane of symmetry 420 extending through center 418 of head 110. As mobile device 102 is swept along azimuthal path 416, a relative position between mobile device 102 and headphones 104 can be tracked. Mobile device 102 and/or headphones 104 can include cameras, depth sensors, or IMUs 209 to track a pose (orientation and position) of mobile device 102 in the head coordinate system reference frame. More particularly, pose detection can be running on mobile device 102 such that the mobile device 102 pose can be calculated in the head coordinate system reference frame as mobile device 102 moves along azimuthal path 416. Accordingly, the locations where sounds 412 are generated can be known locations 414 to audio system 100.

In an aspect, mobile device 102 has a vision system that views user 106 to provide an estimation of a relative angular position and/or distance of mobile device 102 to head 110 based on imagery. Audio system 100 can use structured light scanner (or RGB camera) 112 to determine the relative location between mobile device 102 and head 110 of user 106. Structured light scanner 112 can include a projector to project an infrared light pattern on head 110 of user 106, and a camera to capture images of the infrared light pattern. Structured light scanner 112 of mobile device 102 can capture, while mobile device 102 moves along azimuthal path 416, one or more images of the infrared light pattern projected onto head 110. One or more processors of audio system 100, e.g., device processor 202, can perform image processing on the captured image(s). The image processing can evaluate the infrared light pattern to determine a distance between mobile device 102 and head 110 of user 106. For example, the infrared light pattern can be a grid of infrared dots projected onto head 110. Based on distances between the reflected dots, the one or more processors can determine the distance to head 110 at a location where the image was taken. By capturing the image simultaneously with the emission of sound 412 by device speaker 108 at the location, the one or more processors are able to determine the distance between mobile device 102 and head 110 of user 106 corresponding to the location. Similarly, the image data and/or position data from IMUs 209 can be evaluated to determine an angle between the location and a reference geometry, such as a plane of symmetry 420 extending through head 110 of user 106. Accordingly, the location can be defined in terms of a distance relative to a center 418 of head 110 and an angle relative to plane 420, and thus, the location is a known location 414. Known locations 414 for all sound emissions can be stored by audio system 100 for post-processing as described below.

Relative location between mobile device 102 and headphones 104 can be determined in other manners. For example, headphones 104 may include a camera to detect a relative position between microphone 116 and device speaker 108. The camera can capture images of mobile device 102, and the image data may be combined with tracking information from one or more other sensors of audio system 100, e.g., IMUs 209 of headphones 104 and/or mobile device 102, to determine the relative location between the audio system devices.

In an aspect, audio system 100 includes a third device (other than mobile device 102 and headphones 104) that is capable of determining and tracking relative movement between mobile device 102 and headphones 104. For example, the third device can be a device or apparatus having a camera to capture images of both headphones 104 and mobile device 102, and to determine respective relative locations between the third device and both headphones 104 and mobile device 102 using the image data. The third device can combine the relative location information, e.g., a first relative location between the third device and headphones 104 and a second relative location between the third device and mobile device 102, to determine a relative location between headphones 104 and mobile device 102. Accordingly, the relative location of device speaker 108 and microphone 116 can be determined at each position that device speaker 108 emits sounds 412 toward microphone 116.

Figure 5:
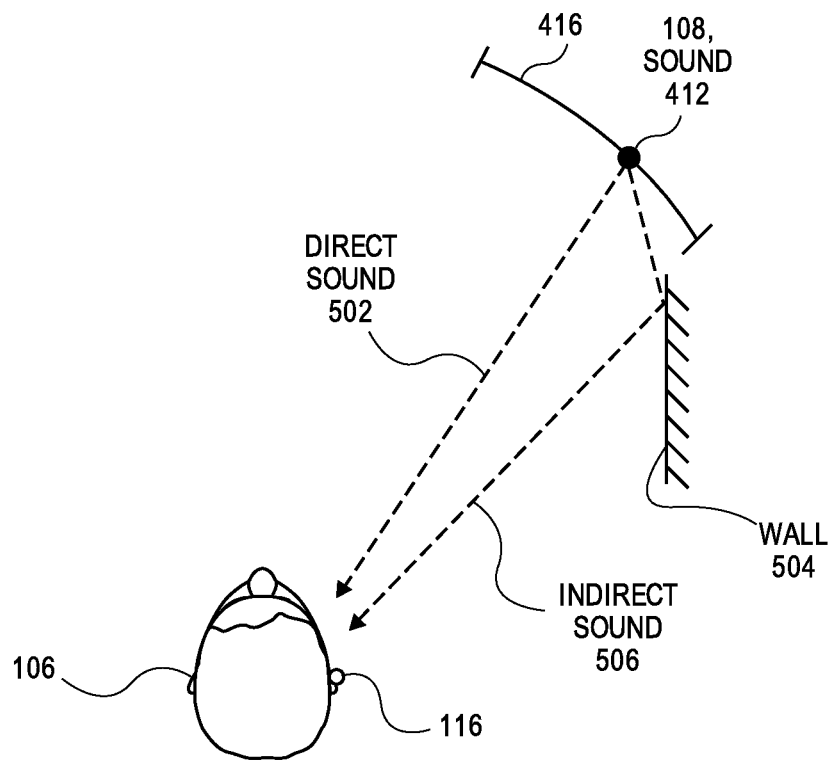
FIG. 5 is a pictorial view of operations to detect input signals corresponding to generated sounds, in accordance with an aspect.

Referring to FIG. 5, a pictorial view of operations to detect input signals corresponding to generated sounds is shown in accordance with an aspect. At operation 304, input signals corresponding to the generated sounds 412 are detected. While mobile device 102 moves along azimuthal path 416 and generates sounds 412, microphone 116 of headphones 104 can receive sounds 412. Microphones 116 can detect input signals corresponding to sounds 412. For example, sounds 412 can propagate from device speaker 108 to microphones 116, and the sound pressure waves can actuate a diaphragm of microphone 116, which is detected by microphone 116 as input signals. The input signals can be recorded for post-processing as described below.

In an aspect, microphones 116 can receive sounds 412 directly from device speaker 108 and/or indirectly from device speaker 108. More particularly, when sound 412 is generated on azimuthal path 416, sound 412 will propagate directly toward user 106 as a direct sound 502. When user 106 is measuring HRTFs 402 in a non-anechoic environment, sound 412 may also propagate toward user 106 indirectly. For example, sound 412 can reflect from a wall 504 or another object to arrive at user 106 as an indirect sound 506. Accordingly, microphone 116 receives one or more sounds directly from device speaker 108 and one or more sounds indirectly from device speaker 108.

HRTF 402 corresponding to sound 412 may be determined by correlating an input signal corresponding to direct sound 502 to the driving signal. A technique referred to herein as windowing can be used to determine which input signals correspond to direct sounds 502 and which input signals correspond to indirect sounds 506. The input signals corresponding to directly receive sounds 412 may then be used to determine HRTF 402.

Windowing can include filtering out reflections or other indirect sounds 506, and can be performed based on information indicating when direct sound 502 should be received at microphones 116. For example, device processor 202 and/or headphone processor 210 can determine a time when the driving signal is reproduced, and thus, the time when sound 412 is generated can be known to audio system 100. In the case of directly received sounds 412, input signals corresponding to direct sound 502 should be detected at a time difference after the generation time that is equal to a distance between mobile device 102 and headphones 104 divided by a speed of sound in air. Based on this expected time of arrival, input signals received at the expected time can be stored for correlation to the driving signal, and similar input signals outside of the expected time window (corresponding to reflections of indirect sounds 506) can be windowed out of the HRTF measurement dataset.

Figure 6:
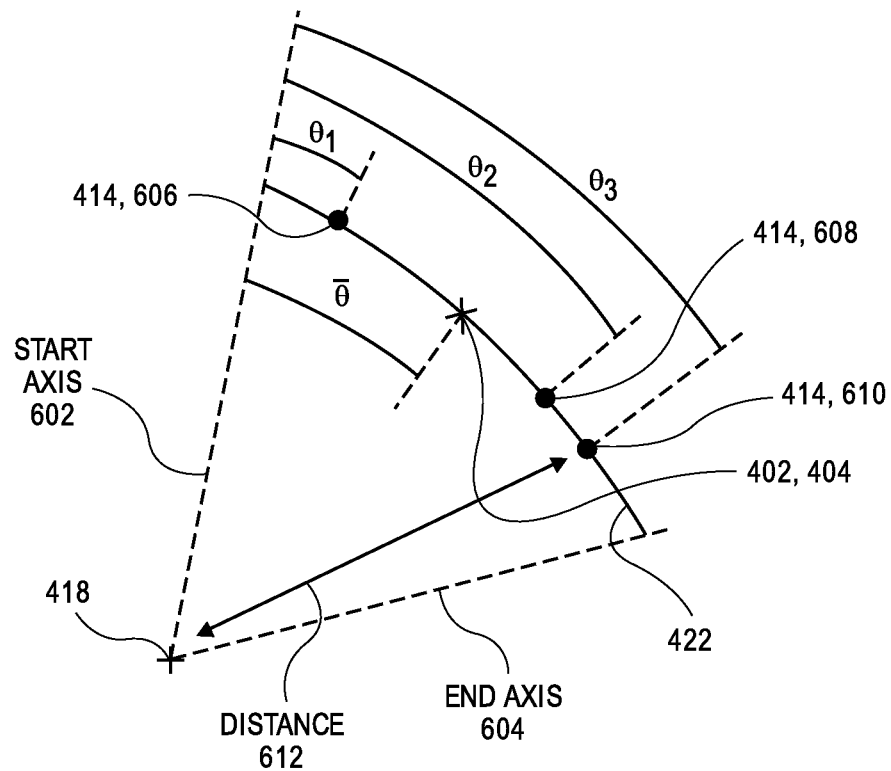
FIG. 6 is a pictorial view of operations to determine an HRTF and an HRTF location, in accordance with an aspect.

Referring to FIG. 6, a pictorial view of operations to determine an HRTF and an HRTF location on an azimuth is shown in accordance with an aspect. At operation 306, HRTFs 402 corresponding to the generated sounds 412 can be determined. In an aspect, an HRTF 402 is determined for each path segment 422 of azimuthal path 416 based on the input signals detected by microphones 116. For example, a single representative HRTF 402 may be determined for each path segment 422 based on several sounds 412 generated at known locations 414 within the path segment 422. Determination of HRTF 402 and HRTF location 404 for a single path segment 422 of azimuthal path 416 between a start axis 602 and an end axis 604 is described below.

In an aspect, HRTF 402 is based on an input signal corresponding to only one of sounds 412 generated along path segment 422. A first sound 606, a second sound 608, and a third sound 610 may be generated at respective known locations 414 along path segment 422 of azimuthal path 416. Path segment 422 may extend along azimuthal path 416 between start axis 602 and end axis 604 radiating from center 418 of head 110. One or more processors of audio system 100 may select one of the sounds 412 for a determination of HRTF 402. For example, the one or more processors may determine that the input signal corresponding to second sound 608 is clear, includes frequency content within a predetermined bandwidth, or has other characteristics that make the input signal preferable (for the purposes of signal processing) to the input signals for first sound 606 and third sound 610. Accordingly, the one or more processors can measure HRTF 402 of path segment 422 based on the input signal corresponding to one of several generated sounds, e.g., second sound 608.

In an aspect, HRTF 402 is based on several input signals corresponding to several sounds generated along path segment 422. For example, the one or more processors of audio system 100 can measure HRTF 402 of path segment 422 based on the input signals corresponding to first sound 606, second sound 608, and third sound 610. In an aspect, first sound 606 may carry frequency content in a first bandwidth, second sound 608 may carry frequency content and a second bandwidth, and third sound 610 may carry frequency content in a third bandwidth. The bandwidths may overlap, or may be entirely separate. In any case, the one or more processors can utilize frequency content from each of the input signals corresponding to the sounds to inform HRTF 402 of path segment 422. More particularly, HRTF 402 can include information about the effect of the ear and head 110 of user 106 on sounds 412 having each of the frequency spectrums. Accordingly, HRTF 402 of path segment 422 may be determined based on measurements of several sounds generated by device speaker 108 within path segment 422.

At operation 308, HRTF locations corresponding to the HRTFs of each path segment 422 can be determined. For example, HRTF location 404 of HRTF 402 can be determined based on known locations 414 where sounds 412 are generated within path segment 422. HRTF location 404 can be along arc segment 422, e.g., on or alongside arc segment 422, between start axis 602 and end axis 604.

In an aspect, HRTF location 404 is co-located with one of the known locations 414 within path segment 422. For example, when HRTF 402 is based on an input signal corresponding to only one sound generated along path segment 422, HRTF location 404 may be assigned to the location on azimuthal path 416 where the single sound 412 was generated. Each known location 414 of sounds 412 can be defined based on an angle between start axis 602 and the known location 414, and a distance 612 between center 418 and the known location 414 on azimuthal path 416. For example, known location 414 of first sound 606 may be at a first angle from start axis 602 and spaced by distance 612 from center 418, known location 414 of second sound 608 may be at a second angle from start axis 602 and spaced by distance 612 from center 418, and known location 414 of third sound 610 may be at a third angle from start axis 602 and spaced by distance 612 from center 418. In the example provided above, the input signal corresponding to second sound 608 was used to determine HRTF 402. In such case, HRTF location 404 may be assigned to the known location 414 of second sound 608. More particularly, HRTF location 404 may be located at the second angle from start axis 602 at distance 612 from center 418.

In an aspect, HRTF location 404 is different than the one or more known locations 414 within path segment 422. For example, HRTF location 404 can be assigned to a midpoint along path segment 422 between start axis 602 and end axis 604. Alternatively, HRTF location 404 can be assigned to an intersection between path segment 422 and either start axis 602 or end axis 604. Other arbitrary locations can be used such that the HRTF locations 404 of consecutive arc segments 422 are evenly spaced from each other along azimuthal arc 416.

In an aspect, HRTF location 404 is assigned to a location along path segment 422 that is an average of known locations 414 of sounds 412 generated within path segment 422. For example, a mean angle from start axis 602 can be determined based on the respective angles of first sound 606, second sound 608, and third sound 610. More particularly, an average of the first angle of first sound 606, the second angle of second sound 608, and the third angle of third sound 610 can be determined. HRTF location 404 may be assigned to the location along path segment 422 at the mean angle from start axis 602 and spaced apart from center 418 by distance 612. Accordingly, the average tracking data for path segment 422 may be used to determine the HRTF locations corresponding to the HRTFs of each path segment.

Figure 7:
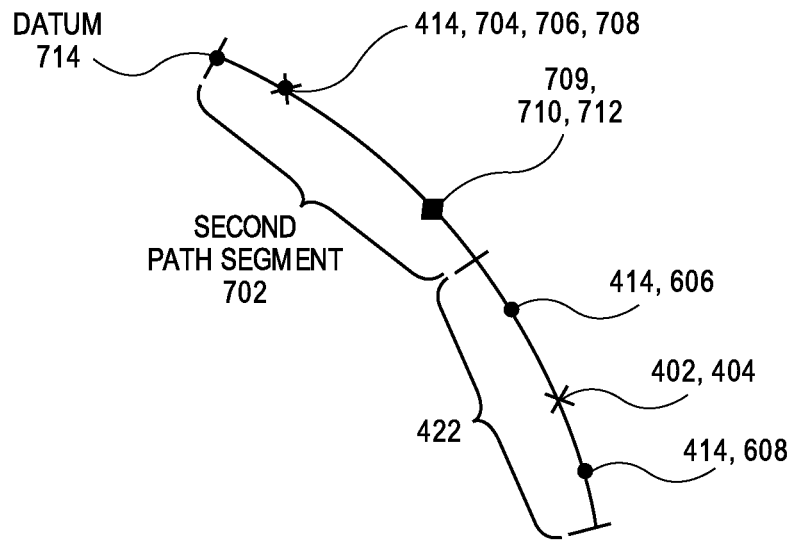
FIG. 7 is a pictorial view of operations to interpolate HRTFs and HRTF locations, in accordance with an aspect.

Referring to FIG. 7, a pictorial view of operations to interpolate HRTFs and HRTF locations on an azimuth is shown in accordance with an aspect. The HRTF profile of user 106 can include HRTF 402 assigned to HRTF location 404 along, e.g., on or near, arc segment 422. HRTF 402 may be made based on input signals corresponding to first sound 606 and second sound 608 generated at known locations 414. By way of example, HRTF 402 can be based on input signals corresponding to both first sound 606 and second sound 608, and HRTF location 404 can be located at a mean angle from the beginning of path segment 422 based on known locations 414 of first sound 606 and second sound 608. Similarly, a second path segment 702 adjacent to path segment 422 may include a second HRTF 704 assigned to a second HRTF location 706. Second HRTF location 706 can be on second path segment 702. For example, a fourth sound 708 may be the only sound 412 generated within second path segment 702. Accordingly, second HRTF 704 may be determined based on the input signal corresponding to fourth sound 708, and second HRTF location 706 may be assigned to known location 414 of fourth sound 708. In other words, second HRTF 704 may be co-located with the origin of fourth sound 708 on second path segment 702.

The measured HRTFs along azimuthal path 416 may be used by the one or more processors of audio system 100 to determine interpolated HRTFs 408. The measured HRTFs 402, 704 may give a semi-complete HRTF dataset, which is sparse relative to the entire length of azimuthal path 416. For example, even if a respective HRTF is determined for each sound generated along azimuthal path 416, there may be locations along azimuthal path 416 where sounds were not generated and that do not have a respective HRTF. Accordingly, HRTF values can be interpolated within azimuthal path 416 to fill in the blanks of the HRTF model.

In an aspect, a third HRTF 710 may be interpolated using HRTF 402 and second HRTF 704. More particularly, third HRTF 710 may be based on a combination of HRTF 402 and second HRTF 704. For example, third HRTF 710 may be an average HRTF value based on the data of HRTF 402 and second HRTF 704. The average value can include, for example, an average amplitude of the HRTFs at each frequency and angle relative to user 106. Accordingly, third HRTF 710 can represent a mean HRTF based on the average of HRTF 402 and second HRTF 704. Other combinations of the HRTF data may be contemplated and used such that third HRTF 710 is based on HRTF 402 and second HRTF 704.

The interpolated HRTFs 408 can be assigned to interpolated HRTF locations 709 based on the HRTF locations of the measured HRTFs. For example, third HRTF 710 may be assigned to an interpolated HRTF location 709 along, e.g., on or adjacent to, azimuthal path 416. Interpolated HRTF location 709 can be a third HRTF location 712 along azimuthal path 416 between HRTF location 404 and second HRTF location 706. A position of third HRTF location 712 along the portion of azimuthal path 416 having path segment 422 and second path segment 702 may be interpolated based on an angle of HRTF location 404 and second HRTF location 706 relative to a datum 714. Datum 714 may be a start position of second path segment 702. HRTF location 404 may be separated from datum 714 by an angle, and second HRTF location 706 may be separated from datum 714 by another angle. Third HRTF location 712 may be located midway between HRTF location 404 and second HRTF location 706, and thus, may be separated from datum 714 by an angle that is an average of the angles separating HRTF location 404 and second HRTF location 706 from datum 714. In the example illustrated in FIG. 7, third HRTF location 712 is located on second path segment 702, however, it will be appreciated that third HRTF location 712 may instead be located along, e.g., on, path segment 422 or even at a point where path segment 422 and second path segment 702 join.

Figure 8:
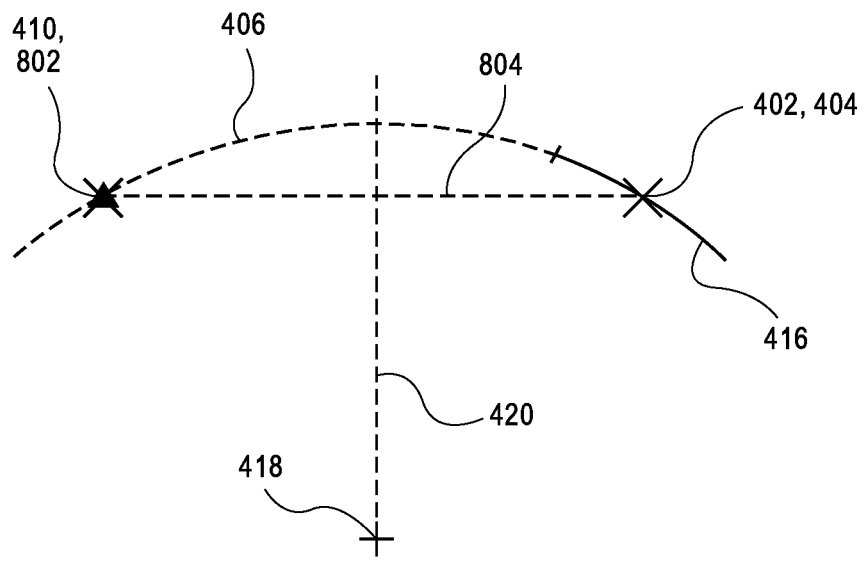
FIG. 8 is a pictorial view of operations to extrapolate HRTFs and HRTF locations, in accordance with an aspect.

Referring to FIG. 8, a pictorial view of operations to extrapolate HRTFs and HRTF locations on an azimuth is shown in accordance with an aspect. The measured HRTFs 402 along azimuthal path 416 may be used by the one or more processors of audio system 100 to determine extrapolated HRTFs 410. The measured HRTFs 402 may give a semi-complete HRTF dataset, which is sparse relative to the entire circumference of azimuth 406. For example, even if a respective HRTF is determined for each sound generated along azimuthal path 416, there may be locations outside of azimuth 406 where sounds 412 were not generated and that do not have a respective HRTF 402. Accordingly, HRTF values can be extrapolated outside of azimuthal path 416 on azimuth 406 to fill in the blanks of the HRTF model.

In an aspect, HRTF 402 is assigned to HRTF location 404 along azimuthal path 416, and HRTF 402 is replicated at one or more additional locations along azimuth 406. For example, HRTF 402 may be assigned to an extrapolated HRTF location 802 on azimuth 406 outside of azimuthal path 416. Accordingly, extrapolated HRTF 410 can be the same as HRTF 402.

Assignment of HRTF 402 to locations on azimuth 406 other than the measured HRTF location 404 may be performed based on an expected symmetry of user 106. For example, plane of symmetry 420 may extend through center 418 of head 110 of user 106, and thus, a distribution of HRTFs on one side of plane of symmetry 420, e.g., a right side of head 110, may approximate a distribution of HRTFs on another side of plane of symmetry 420, e.g., a left side of head 110. Measurements of HRTF values on one side of plane of symmetry 420 may be reflected about the plane to estimate HRTF values on another side of the plane. More particularly, one or more processors of audio system 100 may determine extrapolated HRTF location 802 by mirroring HRTF location 404 about plane of symmetry 420. Mirroring of HRTF location 404 can include projecting HRTF location 404 along an extrapolation axis 804 that extends perpendicular to plane of symmetry 420 onto azimuth 406 on an opposite side of plane of symmetry 420 from azimuthal path 416. By mirroring other HRTFs 402 along azimuthal path 416 to the opposite side of plane 420, an HRTF model can be quickly determined. The model can be generated using a partial dataset based on mobile device movements made on only one side of the plane.

Referring to FIG. 9, a pictorial view of an HRTF map containing HRTFs and HRTF locations is shown in accordance with an aspect. At operation 310, the one or more processors of audio system 100 can generate HRTF map 208 that includes the HRTFs determined using any of the methods described above, as well as the HRTF locations of the HRTFs. For example, HRTF map 208 can include the measured HRTF 402 assigned to the determined HRTF location 404. HRTF map 208 may also include one or more interpolated HRTFs 408 assigned to interpolated HRTF locations 709. Similarly, HRTF map 208 can include one or more extrapolated HRTFs 410 assigned to extrapolated HRTF locations 802. Accordingly, HRTF map 208 can be a dataset to describe a distribution of measured or inferred HRTFs 402 around head 110 of user 106.

HRTF map 208 can be organized in any useful manner, and the dataset illustrated in FIG. 9 is provided by way of example only. In an aspect, HRTF map 208 includes information about HRTFs (402, 408, or 410), locations of HRTFs (404, 709, or 802) on azimuth 406, and/or a type of the HRTFs. For example, the HRTFs that are numbered in the dataset can correspond to particular data files having data that indicates an amplitude adjustment for frequencies of sound impinging on an ear of user 106 when arriving at a particular arrival angle. HRTF map 208 can indicate a location of the corresponding HRTF on azimuth 406 as an angle relative to a zero degree location on plane of symmetry 420, e.g., directly in front of head 110. For example, two measured and one interpolated HRTF are indicated as being located along azimuthal path 416 in a range of 25-35 degrees from plane of symmetry 420. By contrast, two extrapolated HRTFs are indicated as being located on azimuth 406 at mirrored positions of −25 and −35 degrees from plane of symmetry 420. More particularly, HRTFs numbered "4" and "5" are mirrored replications of HRTFs numbered "1" and "3" in HRTF map 208.

Distance 612 between head 110 and azimuth 406 may vary as user 106 sweeps mobile device 102 around head 110. In an aspect, distances are measured along azimuthal path 416, e.g., using structured light scanner 112. An average of the distances 612 measured over the entire arc are used as a radius of azimuth 406. It will be appreciated that the distances 612, and the radius of azimuth 406, as measured based on movements of mobile device 102 held by user 106 will typically be measured within a near field. More particularly, input signals measured by audio system 100 will likely corresponding to sounds 412 made at approximately one meter from head 110, e.g., in the near field.

In an embodiment, distances 612, or changes in the distances 612, can be further informed based on the actual sound signals emitted by mobile device 102 as the device is swept around head 110. Mobile device 102 can have calibrated speakers 108 and headphones 104 can have calibrated microphones 116. Accordingly, signal levels of the input signals from sounds emitted by the speakers 108 can be analyzed to evaluate a distance that the sounds were emitted. More particularly, the distances can be determined based on known or expected attenuation of the signal levels over the distance between speakers 108 and microphones 116. This can be particularly useful when the sound signals have low frequencies. The distances determined by analysis of the sound levels can be used instead of, or combined with, distances determined using structured light scanner 112 or estimated using the presumed or input length of the user's arm. Accordingly, distances 612 between head 110 and azimuth 406 can be accurately estimated.

Measurements, e.g., in the near field or far field, may not provide an accurate representation of virtual sounds coming from the same angle relative to plane of symmetry 420, but farther away than the measurement distance. It is contemplated, however, that audio input signal adjustments can be made to render spatial audio to make a virtual sound source seem much further away than is possible with an HRTF alone. For example, room-reflections can be applied to an audio input signal, e.g., by adding reverberations to a specific modeled room, to give the illusion that a sound is farther away.

Figure 10:
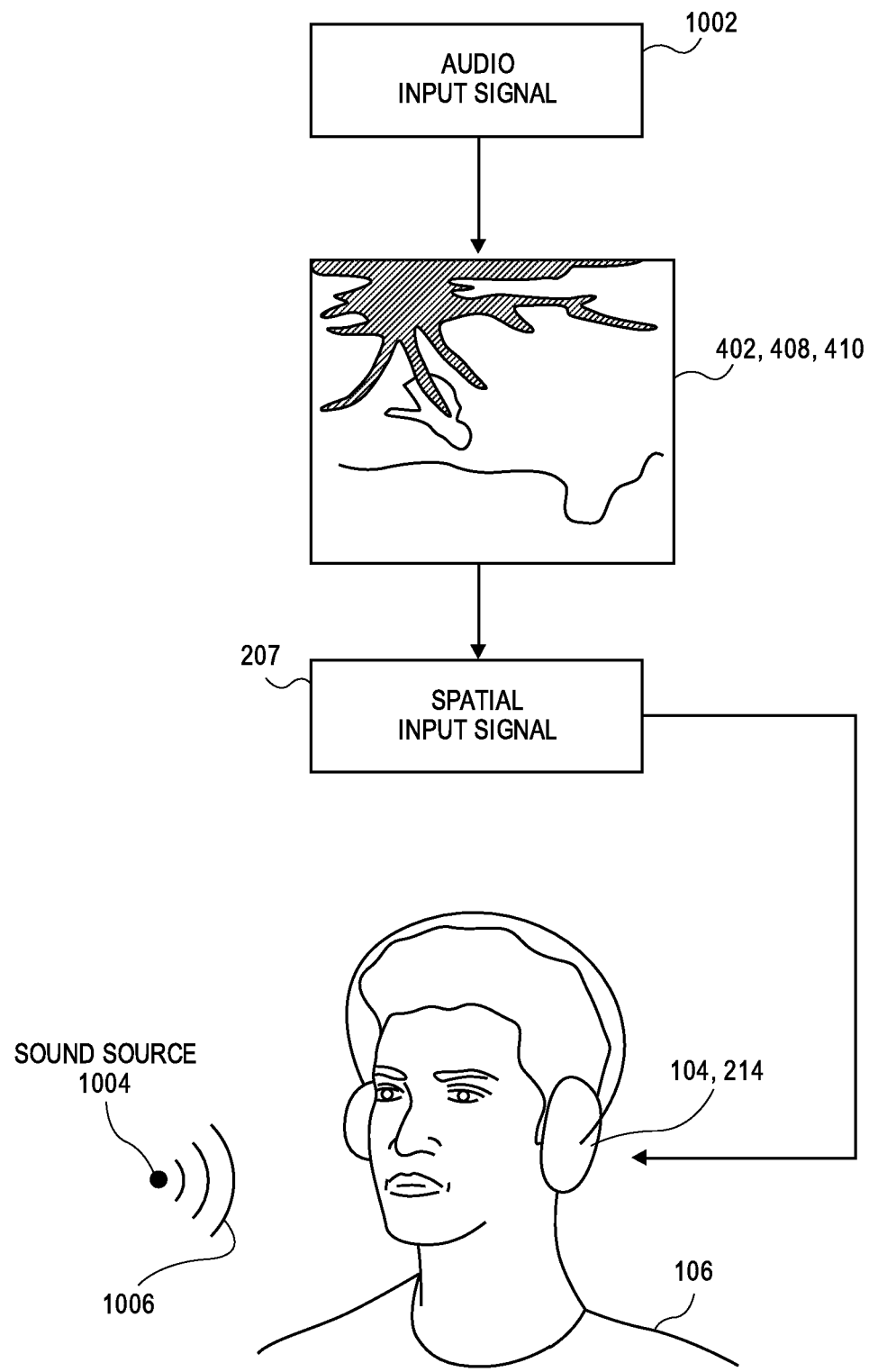
FIG. 10 is a pictorial view of operations to render spatial audio to a user based on an HRTF map, in accordance with an aspect.

Referring to FIG. 10, a pictorial view of operations to render spatial audio to a user based on an HRTF map is shown in accordance with an aspect. At operation 312, an HRTF (402, 408, or 410) of HRTF map 208 can be applied to an audio signal to generate a spatial input signal 207 specific for user 106. The HRTF can be selected from HRTF map 208 based on an intended angle of a sound source 1004 represented in audio input signal 1002. For example, if audio input signal 1002 is a binaural recording of a person speaking at an angle of 35 degrees relative to plane of symmetry 420, the one or more processors of audio system 100 can select HRTF "2" from HRTF map 208 illustrated in FIG. 9 to apply to audio input signal 1002. The selected HRTF can include information about a change in amplitude of an input signal at different frequencies and angles relative to user 106.

Spatial input signal 207 can be generated by applying the HRTF to audio input signal 1002. More particularly, spatial input signal 207 is audio input signal 1002 filtered by the HRTF such that an input sound recording is changed by the diffraction and reflection properties of an anatomy of user 106.

Spatial input signal 207 can be communicated by device processor(s) 202 to headphones 104. For example, user 106 can wear headphones 104 having earphone speaker 214 that directs sound toward the ear of user 106. At operation 314, processor(s) (of mobile device 102 or the headphones 104) can drive earphone speaker 214 with spatial input signal 207 to render a spatialized sound 1006 to user 106. Spatialized sound 1006 can simulate a sound, e.g., a voice, generated by spatial sound source 1004, e.g., a speaking person, in a virtual environment surrounding user 106. More particularly, by driving headphones 104 with spatial input signal 207, spatialized sound 1006 can be rendered at an HRTF location (or at another location in line with the HRTF location relative to center 418). Accordingly, audio system 100 can accurately render spatialized audio to user 106 using HRTF map 208 generated as described above.

As described above, one aspect of the present technology is the gathering and use of data available from various sources to generate an HRTF map. The present disclosure contemplates that in some instances, this gathered data may include personal information data that uniquely identifies or can be used to contact or locate a specific person. Such personal information data can include demographic data, location-based data, telephone numbers, email addresses, TWITTER ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to generate an HRTF map to render spatial audio to the users. Accordingly, use of such personal information data enables users to have an improved spatial audio listening experience. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of spatial audio rendering, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an HRTF can be selected and delivered to users by inferring preferences based on non-personal information data or a bare minimum amount of personal information, such as the content being requested by the device associated with a user, other non-personal information available to the device processors, or publicly available information.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    determining, by one or more processors, known locations of a mobile device relative to headphones worn on a head of a user, wherein determining the known locations is based on tracking data generated by the mobile device while the mobile device moves around the headphones, and wherein the known locations are within an azimuthal path extending around the head of the user;
    generating, by a device speaker of the mobile device, a plurality of sounds at the known locations;
    detecting, by a microphone of the headphones, a plurality of input signals corresponding to the plurality of sounds;
    determining a path segment of the azimuthal path based on the path segment including a threshold number of the known locations;
    determining, by the one or more processors, a head-related transfer function (HRTF) of the path segment based on the plurality of input signals;
    determining, by the one or more processors, an HRTF location along the path segment based on the known locations within the path segment; and
    generating, by the one or more processors, an HRTF map including the HRTF assigned to the HRTF location.

2. The method of claim 1, wherein the device speaker generates the plurality of sounds and the microphone detects the plurality of input signals while the mobile device moves along the azimuthal path around the headphones worn on the head of the user.

3. The method of claim 2 further comprising:
    capturing, by a structured light scanner of the mobile device while the mobile device moves along the azimuthal path, a plurality of images of an infrared light pattern on an object; and
    determining, by the one or more processors, the known locations based on the plurality of images.

4. The method of claim 1 further comprising:
    receiving, by the microphone, one or more of the plurality of sounds directly from the device speaker, and one or more of the plurality of sounds indirectly from the device speaker; and
    determining, by the one or more processors, the HRTF based on the plurality of input signals corresponding to the directly received sounds.

5. The method of claim 1, wherein the HRTF location is different than the known locations within the path segment.

6. The method of claim 1, wherein the HRTF map includes:
    a second HRTF of a second path segment assigned to a second HRTF location on the second path segment, wherein the second HRTF is based on the plurality of input signals; and
    a third HRTF assigned to a third HRTF location along the azimuthal path between the HRTF location and the second HRTF location, wherein the third HRTF is based on the HRTF and the second HRTF.

7. The method of claim 1, wherein the azimuthal path extends along a portion of an azimuth extending around the head of the user, and wherein the HRTF map includes the HRTF assigned to an extrapolated HRTF location along the azimuth outside of the azimuthal path.

8. The method of claim 7 further comprising determining, by the one or more processors, the extrapolated HRTF location by mirroring the HRTF location about a plane of symmetry extending through a center of the head of the user.

9. The method of claim 1 further comprising:
applying, by the one or more processors, the HRTF to an audio input signal to generate a spatial input signal; and
driving, by the one or more processors, an earphone speaker of the headphones with the spatial input signal to render a spatialized sound at the HRTF location.

10. An audio system, comprising:
a mobile device including a device speaker to generate a plurality of sounds at known locations within an azimuthal path extending around a head of a user;
headphones including an earphone speaker, and a microphone to detect a plurality of input signals corresponding to the plurality of sounds; and
one or more processors configured to:
determine the known locations, wherein the known locations are locations of the mobile device relative to the headphones worn on the head of the user, and wherein determining the known locations is based on tracking data generated by the mobile device while the mobile device moves around the headphones,
determine a path segment of the azimuthal path based on the path segment including a threshold number of the known locations,
determine a head-related transfer function (HRTF) of the path segment based on the plurality of input signals,
determine an HRTF location along the path segment based on the known locations within the path segment, and
generate an HRTF map including the HRTF assigned to the HRTF location.

11. The audio system of claim 10, wherein the mobile device includes a structured light scanner to capture, while the mobile device moves along the azimuthal path, a plurality of images of an infrared light pattern on an object, and wherein the one or more processors are configured to determine the known locations based on the plurality of images.

12. The audio system of claim 10, wherein the microphone receives one or more of the plurality of sounds directly from the device speaker, and one or more of the plurality of sounds indirectly from the device speaker, and wherein the one or more processors are configured to determine the HRTF based on the plurality of input signals corresponding to the directly received sounds.

13. The audio system of claim 10, wherein the HRTF map includes:
a second HRTF of a second path segment assigned to a second HRTF location on the second path segment, wherein the second HRTF is based on the plurality of input signals; and
a third HRTF assigned to a third HRTF location along the azimuthal path between the HRTF location and the second HRTF location, wherein the third HRTF is based on the HRTF and the second HRTF.

14. The audio system of claim 10, wherein the azimuthal path extends along a portion of an azimuth extending around the head of the user, and wherein the HRTF map includes the HRTF assigned to an extrapolated HRTF location along the azimuth outside of the azimuthal path.

15. The audio system of claim 10, wherein the one or more processors are configured to:
apply the HRTF to an audio input signal to generate a spatial input signal; and
drive the earphone speaker of the headphones with the spatial input signal to render a spatialized sound at the HRTF location.

16. A non-transitory machine readable medium storing instructions executable by one or more processors of an audio system to cause the audio system to perform a method comprising:
determining, by one or more processors, known locations of a mobile device relative to headphones worn on a head of a user, wherein determining the known locations is based on tracking data generated by the mobile device while the mobile device moves around the headphones, and wherein the known locations are within an azimuthal path extending around the head of the user;
generating, by a device speaker of the mobile device, a plurality of sounds at the known locations;
detecting, by a microphone of the headphones, a plurality of input signals corresponding to the plurality of sounds;
determining a path segment of the azimuthal path based on the path segment including a threshold number of the known locations;
determining, by the one or more processors, a head-related transfer function (HRTF) of the path segment based on the plurality of input signals;
determining, by the one or more processors, an HRTF location along the path segment based on the known locations within the path segment; and
generating, by the one or more processors, an HRTF map including the HRTF assigned to the HRTF location.

17. The non-transitory machine readable medium of claim 16, wherein the device speaker generates the plurality of sounds and the microphone detects the plurality of input signals while the mobile device moves along the azimuthal path around the headphones worn on the head of the user.

18. The non-transitory machine readable medium of claim 16, wherein the HRTF location is different than the known locations within the path segment.

19. The non-transitory machine readable medium of claim 16, wherein the HRTF map includes:
a second HRTF of a second path segment assigned to a second HRTF location along the second path segment, wherein the second HRTF is based on the plurality of input signals; and
a third HRTF assigned to a third HRTF location along the azimuthal path between the HRTF location and the second HRTF location, wherein the third HRTF is based on the HRTF and the second HRTF.

20. The non-transitory machine readable medium of claim 16, wherein the azimuthal path extends along a portion of an azimuth extending around the head of the user, and wherein the HRTF map includes the HRTF assigned to an extrapolated HRTF location along the azimuth outside of the azimuthal path.

* * * * *